United States Patent [19]

Hoch et al.

[11] 4,298,534

[45] Nov. 3, 1981

[54] PREPARATION OF BRILLIANT, TRANSPARENT PIGMENTARY BROMO-ISOVIOLANTHRONE OF HIGH TINCTORIAL STRENGTH

[75] Inventors: Helmut Hoch, Wachenheim; Erwin Hahn, Heidelberg; Heinrich Hiller, Wachenheim, all of Fed. Rep. of Germany

[73] Assignee: BASF Aktiengesellschaft, Ludwigshafen, Fed. Rep. of Germany

[21] Appl. No.: 127,148

[22] Filed: Mar. 4, 1980

[30] Foreign Application Priority Data

Mar. 12, 1979 [DE] Fed. Rep. of Germany ....... 2909568

[51] Int. Cl.$^3$ ............................................... C09B 3/22
[52] U.S. Cl. ..................................................... 260/358
[58] Field of Search ................................ 260/358, 356

[56] References Cited

U.S. PATENT DOCUMENTS

| | | | |
|---|---|---|---|
| 2,882,280 | 4/1959 | Gruenebaum et al. | 260/356 |
| 2,898,337 | 8/1959 | McSheehy | 260/356 |
| 3,127,412 | 3/1964 | Gaertner et al. | 260/356 |

FOREIGN PATENT DOCUMENTS

| | | | |
|---|---|---|---|
| 1284092 | 11/1968 | Fed. Rep. of Germany | 260/358 |
| 947727 | 1/1964 | United Kingdom . | |
| 733461 | 7/1955 | United Kingdom . | |

*Primary Examiner*—Winston A. Douglas
*Assistant Examiner*—Raymond K. Covington
*Attorney, Agent, or Firm*—Oblon, Fisher, Spivak, McClelland & Maier

[57] ABSTRACT

A process for the preparation of pigmentary forms of bromoisoviolanthrone, wherein the leuco compound is oxidized in an aqueous alkaline medium, in the presence of a surfactant, at from 10° to 100° C., with exposure to shearing forces.

The pigment obtained gives full-shade colorations which are very transparent and very brilliant, while in white reductions very deep colorations are obtained.

11 Claims, No Drawings

PREPARATION OF BRILLIANT, TRANSPARENT PIGMENTARY BROMO-ISOVIOLANTHRONE OF HIGH TINCTORIAL STRENGTH

The present invention relates to a process for the preparation of pigmentary forms of bromoisoviolanthrone, which give brilliant, transparent and deep violet colorations.

The term bromoisoviolanthrone is applied to compounds of the isodibenzanthrone series which contain from about 12 to 17% of bromine and up to 1% of chlorine. Such compounds are known in the form of vat dyes (cf. Color Index, Vat Violet 9, C.I. No. 60,005). German Patent 1,284,092 discloses the use of bromoisoviolanthrones as pigments for printing inks, distempers, binder paints, gloss finishes and plastics.

According to German Pat. No. 1,284,092, the $\alpha$-modification of the pigment is obtained by swelling crude bromoisoviolanthrone in sulfuric acid of from 90 to 90.5 percent strength by weight and discharging the swollen mixture into an aqueous dispersant solution. The $\beta$-modification of the pigment is obtained from the $\alpha$-modification by heating the aqueous paste in the presence of N-methylpyrrolidone and of the sodium salt of a condensate of naphthalene-2-sulfonic acid and formaldehyde. According to German Patent 1,284,092, these pigments have excellent heat resistance and very good lightfastness and fastness to weathering. Compared to the chloroisoviolanthrones, eg. Pigment Violet 31, C.I. No. 60,010, the pigments have substantially better fastness to solvents, weathering and migration.

Compared to the pigmentary forms of bromoisoviolanthrone described in German Pat. No. 950,188, the bromoisoviolanthrone pigments described in German Pat. No. 1,284,092, Examples 1 and 2, have greater brilliance and greater tinctorial strength.

Compared to dioxazine pigments of similar hue, eg. Carbazole-Dioxazine Violet, Pigment Violet 23, C.I. No. 51,319, the bromoisoviolanthrone pigments of German Pat. No. 1,284,092 however give substantially paler, duller and bluer colorations whilst at the same time the fullshade colorations are more hiding.

Pigments based on bromoisoviolanthrone should in principle be of interest because of their good fastness characteristics and their good suitability for overcoloring inorganic pigments. However, these bromoisoviolanthrone pigments are only used to a limited extent, because of their low tinctorial strength and dull hue.

It is an object of the present invention to provide a process whereby pigmentary forms of bromoisoviolanthrone are obtained which give transparent fullshade colorations of great brilliance and depth of color in surface coatings. It is a further object of the present invention that the process to be provided shall be easily, reproducibly and cheaply operable industrially.

We have found that these objects are achieved and that bromoisoviolanthrone (C.I. Vat Violet 9; C.I. No. 60,005) can be converted to a tinctorially valuable pigmentary form of the $\alpha$-modification if leuco-bromoisoviolanthrone is oxidized in an aqueous alkaline medium in the presence of a surfactant at from 10° to 100° C., with exposure to shearing forces, and the pigment is isolated.

The pigment obtained by the process of the invention gives colorations of greater transparency and substantially greater billiance in surface coatings than do the pigments disclosed by German Pat. No. 1,284,092. In a white reduction, the pigment obtained by the process according to the invention exhibits 1.4 times the tinctorial strength of the prior art pigments, coupled with a purer and more reddish hue.

Compared to the dioxazine pigment Pigment Violet 23; C.I. No. 51,319, the bromoisoviolanthrone pigment obtained by the present process exhibits about the same tinctorial strength and brilliance, but a substantially more reddish hue.

The pigment obtained by the process according to the invention is readily dispersible in printing inks and finishes.

The process according to the invention is in general carried out by adding one or more surfactants to a suspension of the leuco-bromoisoviolanthrone, which suspension contains an alkali metal hydroxide, and then oxidizing the leuco compound at from 10° to 100° C., with exposure to shearing forces. After completion of the oxidation, the pigment is separated off and isolated.

The suspension of the leuco-bromoisoviolanthrone, which is in the form of an alkali metal salt and which is hereafter also referred to simply as leuco compound, may be prepared by vatting bromoisoviolanthrone directly or by preparing a suspension of previously isolated leuco compound. In the later case, the bromoisoviolanthrone is vatted in from 20 to 60 parts by weight of water per part of isoviolanthrone compound.

The amount of alkali metal hydroxide—the latter being preferably used in the form of sodium hydroxide solution—depends on the amount of dithionite. In general, when using sodium hydroxide the amount of alkali metal hydroxide is from 100 to 200 percent of the amount of alkali metal dithionite. The amount of dithionite required—the dithionite preferably being in the form of the sodium salt—is from 10 to 50 percent by weight, based on bromoisoviolanthrone.

Vatting is carried out at from 10° to 80° C., especially from 20° to 60° C. The reduction is complete after from 0.15 to 2 hours, the leuco compound having precipitated. The compound is then isolated. However, it is also possible to use direct the aqueous suspension obtained, though this is not advantageous because of the large volume of liquid (resulting in a low space-time yield of the pigmentary form).

Isolating the vat form of the bromoisoviolanthrone is advantageous if the starting material is to be subjected to additional purification, for example to remove vat-soluble by-products. The filter residue is then advantageously washed with blank vat at from 20° to 30° C., until the filtrate shows only a pale violet color. The blank vat used is a solution of 20 parts by weight of 50 percent strength by weight sodium hydroxide solution and 10 parts by weight of sodium dithionite in 1,000 parts by weight of water.

If bromoisoviolanthrone which is sufficiently pure for pigmentary purposes is used as the starting material, the suspension of the leuco compound, obtained on vatting, can be oxidized directly. In that case, the bromoisoviolanthrone is advantageously vatted in an aqueous suspension of from 8 to 15 percent strength by weight. In that case, vatting is carried out with from 20 to 50 percent by weight of sodium hydroxide, and from 20 to 50 percent by weight of sodium dithionite, based on bromoisoviolanthrone. As a rule, vatting is complete after from 5 to 20 minutes.

The oxidation is carried out in an alkaline aqueous medium in the presence of a surfactant, with exposure to shearing forces. Advantageously, the leuco compound is oxidized in an alkaline aqueous suspension which at the start of the oxidation contains from 1 to 20 percent by weight of sodium dithionite, based on leuco compound. Advantageously, the suspension of the leuco compound contains from 5 to 30 percent by weight of alkali metal hydroxide, preferably sodium hydroxide, and from 1 to 20, preferably from 5 to 10, percent by weight of sodium dithionite, the percentages being based on leuco compound, and the surfactant or surfactants. The concentration of the leuco compound in the suspension is as a rule from 5 to 15 percent by weight.

The shearing forces are generated in the aqueous suspension by a grinding medium, preferably glass balls, ceramic balls, metal balls or plastic balls or sand, which are agitated by high-speed stirrers. Examples of suitable equipment to use are sand mills and bead mills.

The amount of grinding medium is as a rule from 20 to 40 times the amount by weight of the leuco compound.

The oxidation can be effected by introducing air during milling or by adding oxidizing agents before and/or during milling.

Suitable oxidizing agents include atmospheric oxygen, oxidizing salts, eg. nitrates and chlorates, oxidizing dilute acids, eg. dilute nitric acid, nitro compounds, eg. 3-nitrobenzenesulfonic acid, hydrogen peroxide and its adducts, eg. sodium percarbonate and sodium perborate. The oxidation temperature is from 10° to 100° C., preferably from 20° to 60° C. The preferred oxidizing agent is atmospheric oxygen.

Suitable surfactants for use according to the invention are nonionic surfactants but especially anionic and cationic surfactants.

The amount of these surfactants is from 0.2 to 20, preferably from 0.5 to 15, percent by weight, based on the leuco compound.

Examples of anionic surfactants are $C_{13}$–$C_{18}$-paraffinsulfonic acids, $C_{13}$–$C_{18}$-paraffindisulfonic acids, di-$C_1$–$C_4$-alkyl sulfosuccinates, sulfonated oleic acid dibutylamide, $C_8$–$C_{18}$-alkylbenzenesulfonates, mono- and di-$C_3$–$C_8$-alkyl-naphthalene-2-sulfonic acids, condensates of naphthalene-2-sulfonic acid or of $C_1$–$C_4$-alkylnaphthalene-2-sulfonic acids and formaldehyde, condensates based on formaldehyde, phenolsulfonic acid and urea, N-$C_{12}$–$C_{18}$-alkyl-N-methyl-aminoacetic acids, abietic acid, rosin, hydrogenated rosin and dimerized rosin in the form of the alkali metal salts and/or ammonium salts.

Examples of suitable nonionic surfactants are $C_{12}$–$C_{20}$-fatty alcohols and adducts of ethylene oxide with $C_{10}$–$C_{20}$-fatty alcohols, with fatty acids of 16 to 20 carbon atoms, with amides of $C_{16}$-$C_{20}$-fatty acids, with rosin, with $C_{16}$–$C_{20}$-alkylamines, with mono-$C_{12}$–$C_{20}$-alkenylamines, eg. oleylamine, with $C_8$–$C_{20}$-alkylphenols, and with monoglycerides of fatty acids, the molar ratio of ethylene oxide to compound undergoing oxyalkylation being in general from 1:1 to 30:1.

Examples of suitable cationic surfactants are tri-($C_1$–$C_4$-alkyl)-phenylammonium salts, tri-($C_1$–$C_4$-alkyl)-benzylammonium salts, di-($C_1$–$C_4$-alkyl)-dibenzylammonium salts, $C_{10}$–$C_{20}$-alkyl-tri-($C_1$–$C_4$-alkyl)-ammonium salts, di-($C_{10}$–$C_{20}$-alkyl)-di-($C_1$–$C_4$-alkyl)-ammonium salts, salts of quaternary tri-$C_1$-$C_8$-alkylammonium-polyglycol-ethers, N-$C_{10}$–$C_{16}$-alkylpyridinium salts, benzylpyridinium salts, N-$C_{10}$–$C_{18}$-imidazolinium salts and salts of quaternized esters of triethanolamine and stearic acid (in the molar ratio of 1:1), the salts being in the form of the chlorides, sulfates, methylsulfates, toluenesulfonates or benzenesulfonates.

Preferred surfactants are abietic acid, rosin, hydrogenated rosin and dimerized rosin in the form of the alkali metal salts or ammonium salts, and tri-($C_1$-$C_4$-alkyl)-phenylammonium salts, tri-($C_1$-$C_4$-alkyl)-benzylammonium salts, di-($C_1$–$C_4$-alkyl)-dibenzylammonium salts, $C_{10}$–$C_{20}$-alkyl-tri-($C_1$-$C_4$-alkyl)-ammonium salts, di-($C_{10}$-$C_{20}$-alkyl)-di-($C_1$-$C_4$-alkyl)-ammonium salts and salts of esters of triethanolamine and stearic acid (in the molar ratio of 1:1) quaternized with, for example, dimethyl sulfate, the salts being in the form of the chlorides, sulfates, methylsulfates, toluenesulfonates or benzenesulfonates.

Specific examples of preferred surfactants in addition to those already mentioned are trimethyl-laurylammonium salts, distearyl-dimethyl-ammonium salts, oleylamine which has been reacted with from 5 to 10 moles of ethylene oxide and been quaternized with dimethyl sulfate, and the ester mixture, obtained by reacting triethanolamine with stearic acid (in the molar ratio of 1:1), quaternized with dimethyl sulfate.

Particularly advantageous pigments are obtained by using from 10 to 15 percent by weight, based on the leuco compound, of anionic surfactants, or from 5 to 10 percent by weight of surfactant quaternary ammonium salts, or using oxyethylated oleylamine (obtained with from 5 to 10 moles of ethylene oxide per mole of oleylamine).

For example, if the oxidation is carried out in the presence of from 10 to 15 percent by weight (based on leuco compound) of rosin, dimerized rosin, hydrogenated rosin or oxyethylated rosin (obtained with from 20 to 30 moles of ethylene oxide per mole of rosin), the pigmentary forms obtained exhibit high tinctorial strength and give highly saturated colorations (ie. a pure hue) and a substantially more reddish hue than the prior art pigments.

A similar result is obtained if the oxidation is carried out in the presence of from 4 to 10 percent by weight (based on leuco compound) of surfactant quaternary ammonium compounds, eg. lauryl-trimethyl-ammonium chloride.

If the oxidation is carried out in the presence of mixtures of anionic and cationic surfactants, with exposure to shearing forces, particularly advantageous pigmentary forms of bromoisoviolanthrone are obtained.

The oxidation is therefore preferably carried out in the presence of anionic surfactants, especially of rosin, dimerized rosin or hydrogenated rosin and surfactant quaternary ammonium salts, eg. trimethyl-laurylammonium salts, trimethyl-stearyl-ammonium salts, distearyl-dimethyl-ammonium salts, esters of stearic acid and triethanolamine (in the molar ratio 1:1) quaternized with dimethyl sulfate, dibenzyl-dimethyl-ammonium salts, oleylamine oxyethylated with from 5 to 10 moles of ethylene oxide and quaternized with dimethyl sulfate, or the reaction product of oleylamine with from 10 to 25 moles of ethylene oxide; an example of a preferred embodiment is to use a mixture which contains—based on leuco compound—from 10 to 15 percent by weight of rosin, hydrogenated rosin and/or dimerized rosin and from 2 to 5 percent by weight of surfactant quaternary ammonium salts.

The aqueous alkaline pigment suspension obtained by oxidation is first separated from the grinding medium and then rendered neutral or slightly acid (pH 5–7) with acid, preferably with hydrochloric acid or sulfuric acid of from 10 to 30 percent strength by weight. The pigment is separated off in a conventional manner, for example by filtering or centrifuging, and is washed and dried. Drying is advantageously carried out under mild conditions, for example under reduced pressure at 60°–80° C.

The Examples which follow, and in which parts and percentages are by weight, illustrate the process according to the invention.

EXAMPLE 1

50 parts of bromoisoviolanthrone (=Vat Violet 9, C.I. No. 60,005; prepared in accordance with Example 1 of German Pat. No. 1,284,092) are introduced, in the form of a moist press cake, into 1,700 parts of water and the mixture is stirred until homogeneous. 40 parts of 50 percent strength sodium hydroxide solution and 20 parts of sodium dithionite are added at 40° C. and stirring is continued for 2 hours. The leuco compound salt, which has precipitated, is filtered off after the mixture has cooled to 20° C., and is washed with 200 parts of blank vat (a solution of 20 parts of 50 percent strength sodium hydroxide solution and 10 parts of sodium dithionite in 1,000 parts of water).

The filter residue is stirred with water to form a suspension having a solids content of about 10%. 20 parts of 50 percent strength sodium hydroxide solution and 5 parts of sodium dithionite are then added, while stirring. An alkaline solution, containing 5 parts of rosin soap in the form of the sodium salt, and 800 parts of glass beads or plastic beads (diameter from 0.8 to 1 mm) are then introduced into the suspension. The latter is subsequently stirred in air by means of a highspeed stirrer (2,000 rpm), whilst keeping the temperature at from 30° to 40° C. The oxidation is complete after 3 hours.

The beads are separated from the suspension by sieving and are washed with 500 parts of water to remove adhering colorant. The aqueous pigment suspension is brought to pH 5.5 with 10 percent strength sulfuric acid and is then stirred for 30 minutes. Thereafter it is filtered and the filter residue is washed neutral and dried under reduced pressure at 70° C.

Yield: 49 parts of pigment which in a full-shade baking finish gives a substantially more brilliant and more transparent coloration than the pigment described in German Pat. No. 1,284,092. A white reduction is substantially more deeply colored, with a substantially redder and purer hue, than that obtained with the prior art bromoisoviolanthrone pigments.

EXAMPLE 2

50 parts of bromoisoviolanthrone (prepared in accordance with Example 1 of German Pat. No. 1,284,092) are introduced, in the form of a moist press cake, into 1,700 parts of water and the mixture is stirred until homogeneous. 40 parts of 50 percent strength sodium hydroxide solution and 20 parts of sodium dithionite are added at 40° C. and the mixture is stirred for 2 hours at this temperature. The leuco compound salt, which has precipitated, is filtered off after the mixture has cooled to 20° C., and is washed with 200 parts of blank vat.

The filter residue is stirred with water to give a suspension having a solids content of about 10%. 15 parts of 50 percent strength sodium hydroxide solution and 5 parts of sodium dithionite are then added, whilst stirring. 5 parts of lauryl-trimethyl-ammonium chloride and 800 parts of glass beads (diameter from 0.8 to 1 mm) are introduced into the suspension and the latter is stirred for 3 hours in air, using a high-speed stirrer (2,000 rpm). Subsequent working up takes place as in Example 1.

48 parts of a pigment, having the same properties as the pigment of Example 1, are obtained.

EXAMPLE 3

100 parts of bromoisoviolanthrone (prepared as described in Example 1 of German Pat. No. 1,284,092), in the form of the moist press cake, are introduced into 900 parts of water. 40 parts of 50 percent strength sodium hydroxide solution and 10 parts of sodium dithionite are added at 25° C., with thorough mixing. The suspension is mixed vigorously for 10 minutes, after which an alkaline solution of 12 parts of rosin soap, in the form of the sodium salt, is stirred in. 1,600 parts of glass beads (diameter from 0.8 to 1 mm) are then added to the mixture, and the latter is stirred for 4 hours in air, using a high-speed stirrer (2,000 rpm). The further working up takes place as in Example 1. 101 parts of a pigment which colors baking finishes in brilliant violet hues are obtained. The tinctorial properties of the pigment correspond to those of the pigment from Example 1.

COMPARATIVE EXAMPLE (German Pat. No. 1,284,092, Example 1)

20 parts of bromoisoviolanthrone are introduced into 400 parts of 90 percent strength sulfuric acid and the mixture is stirred for 20 hours at room temperature. It is then heated to 80° C. and stirred at this temperature for 45 minutes. After cooling to 25° C., the suspension is poured, with vigorous stirring, into 4,000 parts of water at 20° C., in which 2 parts of dodecyl alcohol have been emulsified. Stirring is continued for 30 minutes, after which the product is filtered off and washed neutral. The filter residue is dried under reduced pressure at 70° C. 20 parts of pigment are obtained; compared to the pigments obtained according to Examples 1, 2 and 3, this product gives high-hiding, substantially duller colorations in a full-shade baking finish. Compared to the bromoisoviolanthrone pigments of Examples 1, 2 and 3, the tinctorial strength of the pigment is only about 70%, and at the same time the hue is substantially duller and more bluish.

EXAMPLE 4

100 parts of bromoisoviolanthrone (prepared as described in Example 1 of German Pat. No. 1,284,092), in the form of a moist press cake, are introduced into 900 parts of water. 40 parts of 50% strength sodium hydroxide solution and 18 parts of sodium dithionite are added at 25° C., with thorough mixing, and thereafter the batch is mixed vigorously for 10 minutes.

15 parts of rosin soap in the form of an alkaline solution of the sodium salt, and 3 parts of lauryl-trimethyl-ammonium chloride, are then stirred into the mixture. After adding 1,600 parts of plastic beads (diameter from 0.8 to 1 mm), the mixture is stirred for 4 hours in air, using a high-speed stirrer (2,000 rpm). Working up takes place as described in Example 1.

Yield: 103 parts of a pigment which in a baking finish gives brilliant violet colorations. In its tinctorial properties, the pigment corresponds to that of Example 1, but its ease of dispersion is substantially greater than that of the pigment of Example 1.

EXAMPLES 5 TO 12

On using the procedure described in Example 4, but with the surfactants listed in the Table below, in the amounts shown, pigmentary forms which are tinctorially superior to the prior art products are again obtained.

The colorations obtained with the pigments were compared with the colorations given by the pigment of Example 4 (column 4 of the Table).

TABLE

| Example | Surfactant | Yield [Parts] | [parts] | Pigment tinctorial assessment compared to the pigment of Example 4 |
|---|---|---|---|---|
| 5 | oxyethylated rosin (30 moles of ethylene oxide/mole) | 10 | 102 | about 10% paler, substantially bluer |
| 6 | dimerized rosin (sodium salt) | 10 | 102 | like Example 4, but somewhat more difficult to disperse |
| 7 | oleic acid ethanolamide | 5 | 103 | about 10% paler, otherwise as in Example 4 |
| 8 | rosin (sodium salt) + oxyethylated oleylamine (6–10 moles of ethylene oxide/mole), quaternized with dimethyl sulfate | 15 / 5 | 102 | about 5% paler, otherwise as in Example 4 |
| 9 | rosin (sodium salt) + reaction product of stearic acid and triethanolamine, quaternized with dimethyl sulfate | 12 / 3 | 103 | corresponds to Example 4 |
| 10 | rosin (sodium salt) + distearyl-dimethyl-ammonium chloride | 15 / 2 | 103 | corresponds to Example 4 |
| 11 | $C_{16}$-fatty alcohol + $C_{16}$-fatty alcohol oxyethylated with 25–30 moles of ethylene oxide/mole | 8 / 6 | 102 | about 15% paler, bluer, same purity of hue, more easily dispersible |
| 12 | dimerized rosin (sodium salt) + benzylpyridinium chloride | 15 / 3 | 101 | about 10% paler, for comparable hue and purity, somewhat less easily dispersible |

We claim:

1. A process for the preparation of a bromoisoviolanthrone pigment, in the α-modification, having high tinctorial strength, comprising: oxidizing leuco-bromoisoviolanthrone suspended in an aqueous alkaline medium containing a surfactant at a temperature of 10° to 100° C. while subjecting said leuco-bromoisoviolanthrone to shearing forces; and isolating the oxidized pigment.

2. The process as claimed in claim 1, wherein the oxidation is conducted in the presence of from 0.2 to 20 percent by weight, based on the leuco compound, of a surfactant.

3. The process as claimed in claim 2, wherein the oxidation is conducted in the presence of from 0.5 to 15 percent by weight, based on the leuco compound, of a surfactant.

4. A process for the preparation of a bromoisoviolanthrone pigment, in the α-modification, having high tinctorial strength, comprising: oxidizing leuco-bromoisoviolanthrone suspended in an aqueous alkaline medium containing from 1 to 20% by weight, based on the leuco compound, of sodium dithionite in the presence of from 0.2 to 20% by weight, based on the leuco compound, of at least one surfactant at a temperature from 10° to 100° C. while subjecting said leuco-bromoisoviolanthrone to shearing forces; and isolating the oxidized pigment.

5. The process as claimed in claim 4, wherein said oxidation step is conducted in an aqueous medium which initially contains from 5 to 30 percent by weight of sodium hydroxide, from 5 to 10 percent by weight of sodium dithionite and from 0.5 to 15 percent by weight of at least one surfactant, the percentages being based on the leuco compound.

6. The process as claimed in claim 4 or 5, wherein the oxidation of the leuco compound is conducted at from 20° to 60° C.

7. The process as claimed in claim 4, 5 or 6, wherein said surfactant is selected from the group consisting of the $C_{13}$–$C_{18}$-paraffinsulfonic acids, $C_{13}$–$C_{18}$-paraffindisulfonic acids, di-$C_1$–$C_4$-alkyl sulfosuccinates, sulfonated oleic acid dibutylamide, $C_8$–$C_{18}$-alkylbenzenesulfonates, mono- and di-$C_3$–$C_8$-alkyl-naphthalene-2-sulfonic acids, condensates of naphthalene-2-sulfonic acid or $C_1$–$C_4$-alkylnaphthalene-2-sulfonic acids and formaldehyde, condensates based on formaldehyde, phenolsulfonic acid and urea, N-$C_{12}$–$C_{18}$-alkyl-N-methyl-aminoacetic acids, abietic acid, rosin, hydrogenated rosin or dimerized rosin in the form of an alkali metal salt or ammonium salt, tri-($C_1$–$C_4$-alkyl)-phenylammonium salts, tri-($C_1$–$C_4$-alkyl)-benzylammonium salts, di-($C_1$–$C_4$-alkyl)-dibenzylammonium salts, $C_{10}$–$C_{20}$-alkyl-tri-($C_1$–$C_4$-alkyl)-ammonium salts, di-($C_{10}$–$C_{20}$-alkyl)-di-($C_1$–$C_4$-alkyl)-ammonium salts, salts of quaternary tri-$C_1$–$C_8$-alkyl-ammonium-polyglycol-ethers, N-$C_{10}$–$C_{16}$-alkylpyridinium salts, benzylpyridinium salts, N-$C_{10}$–$C_{18}$-imidazolinium salts and salts of quaternized esters of triethanolamine and stearic acid (in the molar ratio of 1:1), the salts being in the form of the chlorides, sulfates, methyl-sulfates, toluenesulfonates or benzenesulfonates, $C_{12}$–$C_{20}$-fatty alcohols and adducts of ethylene oxide with $C_{10}$–$C_{20}$-fatty alcohols, with fatty acids of 16 to 20 carbon atoms, with amides of $C_{16}$–$C_{20}$-fatty acids, with rosin, with $C_{16}$–$C_{20}$-alkylamines, with mono-$C_{12}$–$C_{20}$-alkenylamines, with $C_8$–$C_{20}$-alkylphenols and with monoglycerides of fatty acids, the molar ratio of ethylene oxide to the compound undergoing oxyalkylation being from 1:1 to 30:1.

8. The process as claimed in claim 4, 5 or 6, wherein said surfactant is abietic acid, rosin, hydrogenated rosin or dimerized rosin in the form of an alkali metal salt or ammonium salt, or is a tri-($C_1$–$C_4$-alkyl)-phenylammonium salt, tri-($C_1$–$C_4$-alkyl)-benzylammonium salt, di-($C_1$–$C_4$-alkyl)-dibenzyl-ammonium salt, $C_{10}$–$C_{20}$-alkyl-tri-($C_1$–$C_4$-alkyl)-ammonium salt, di-($C_{10}$–$C_{20}$- alkyl)-di-($C_1$-$C_4$-alkyl)-ammonium salt or a salt of an ester, quaternized with dimethyl sulfate, of triethanolamine and stearic acid in a molar ratio of 1:1, the salts being in the form of the chlorides, sulfates, methylsulfates, toluenesulfonates or benzenesulfonates.

9. The process as claimed in claim 4, wherein said surfactant is a mixture of anionic and cationic surfactants.

10. The process as claimed in claim 9, wherein said surfactant is a mixture of rosin, dimerized rosin or hydrogenated rosin and a $C_{10}$-$C_{20}$-alkyl-tri-($C_1$-$C_4$-alkyl)-ammonium salt or di-($C_{10}$-$C_{20}$-alkyl)-di-($C_1$-$C_4$-alkyl)-ammonium salt.

11. The process as claimed in claim 9, wherein the mixture comprises from 10 to 15% by weight of anionic surfactants and from 2 to 5% by weight of surfactant quaternary ammonium salts.

* * * * *